Patented Oct. 15, 1940

2,217,988

UNITED STATES PATENT OFFICE 2,217,988

PLASTICIZED RESINOUS MATERIAL

Harry W. Lawson and John L. Gillerlain, Chicago, Ill., assignors, by mesne assignments, to Albert E. Starkie, Oak Park, Ill., and Otto Eisenschiml, Chicago, Ill., jointly No Drawing. Application March 23, 1938, Serial No. 197,600

8 Claims. (Cl. 106—31)

The present invention relates to improvements in resinous products for use in the preparation of thermoplastic compounds for molding and coating purposes and the like and in the resulting thermoplastic compounds; and more particularly to the modification or plasticizing of the resinous materials used in such compounds. It will be fully understood from the following description, and the illustrative examples of the invention which are therein set forth.

In the preparation of various types of thermoplastic compounds suitable for use in the production of flooring and wall tile, various molded products, and the like, efforts have been made to employ resinous binders in order to secure products which are of relatively light colors without the use of excessive quantities of pigment such as are required when asphaltic binders are employed, and which will otherwise be free of the objectionable features of asphaltic binders, such as dark color and low wetting or absorptive qualities in respect of the fillers or pigments employed. In order to produce such compounds with resinous binders, various materials have been employed to modify or plasticize the resins, such as fatty acid pitch, polymerized drying oils, soft synthetic resins and natural resins and the like. Such plasticized resinous binders are, however, inordinately expensive as well as being largely unsatisfactory from the standpoint of various physical factors, such as strength, tenacity, and also in capacity of wetting the fillers and pigments rapidly and effectively, thus necessitating the use of relatively larger proportions of plasticized resinous binders.

In accordance with the present invention, we have found that satisfactory products can be made, including light colored products, by employing as a binder resinous compounds modified or plasticized by the addition of non-paraffinic solvent extracts from heavier petroleum oils of the lubricating oil type, and more particularly from residual stocks.

The resin or gum which is employed may be a natural resinous material or a synthetic resin of the character used in the varnish and paint industries. Ordinarily the less expensive resins or varnish gums are employed, such as the coumarone and paracoumarone resins having melting points of 200 to 300° F., ester gum, East India gum, Batu resin or the like or mixtures thereof; however, as is readily apparent, when the nature of the product desired requires the use of a higher grade resin, the more expensive resinous materials such as the synthetic phenolic resins and the fossil and higher grade resins, for example, kauri, copal, dammar or the like may be employed.

The non-paraffinic solvent extract from the heavy petroleum oils which is used in accordance with the present invention is the extracted portion of such oils which is removed by solvents having a selective or preferential solvent action for non-paraffinic constituents of heavy petroleum oils. Such solvents are employed in processes for the refining of the lubricant fractions of petroleum oils in order to leave a more highly paraffinic portion having a low viscosity coefficient. The extracted material is generally regarded as being largely of naphthenic and aromatic hydrocarbons. Solvents which are used in such processes are furfural, dichlorethylether, phenol, cresol, nitrobenzol and the like. After the treatment of the heavy petroleum oil fraction with such solvents, the solvent and extracted constituents of the oil are removed and the solvent distilled off, leaving as a residuum the non-paraffinic solvent extract.

The extracts employed in carrying out the present invention may be derived from heavy petroleum lubricant distillates or from residual lubricant fractions, such as bright oils and cylinder stocks. They may range in gravity from 15° to 8° A. P. I. at 60° F.; in flash point from 420 to well over 500° F. and in pour test from 20° to 90° F. and higher. They may be derived from any of the mixed type petroleum oils, such as the Mid-Continent or Coastal oils, from California oils and, to a lesser extent, from Pennsylvania type oils. Thus we have employed an extract derived from a Mid-Continent residual stock by extraction with dichlorethylether, having a gravity of 9.4° A. P. I. at 60° F., a flash point of 515° F. and a pour test of 65° F.; and a product derived by furfural extraction from a coastal oil having a gravity of 7.6° A. P. I., and a flash test of 425° F., as well as others of the character hereinbefore set forth.

In carrying out the present invention, the non-paraffinic heavy petroleum extract is preferably first compounded with the resin or gum and the fillers and pigments subsequently incorporated. The proportion of the non-paraffinic extract which is employed relative to the resin or gum will vary somewhat in accordance with the character of the gum and the extract and the type of product which is to be made. For example, with a 250° F. melt point coumarone resin and a heavier extract derived from a residual petroleum oil stock, for the production of a material used for flooring purposes, tile, expansion joints or the like, from 15 to 30 parts of the extract may be employed with 85 to 70 parts of the resin. In some cases, where higher proportions of fillers are employed and strength and tenacity of the compound are not of so great importance, the proportion of the non-paraffinic oil extract may be substantially increased, say to as high as 70% of the resin-extract mixture, or lighter extracts derived, for example, from distillate oils may be employed.

The resin or gum and the extract are suitably mixed with each other and with the fillers or pigments or both at elevated temperatures under conditions such that the resin binder is effectively plasticized and a pliable, plastic mass secured. Preferably, the resin or gum and the extract are heated together in a suitable mixer under fusion conditions until a uniform, homogeneous mass is secured, ordinarily at temperatures of 300 to 450° and subsequently the desired proportions of fillers and pigments may be incorporated. The proportion of the modified or plasticized resinous binder in the final composition will vary in accordance with the character of the composition and the purpose for which it is intended, and may be from 10% upwardly, in some cases to as high as 50 to 60%. For molded products of the type of flooring tile or floor compositions, molding compounds, wire coatings, sound deadeners and the like, the proportion of the resinous compound in the final thermoplastic composition may be from 20 to 40%. Generally, in tile and flooring products, for example, it is in the range of 25 to 35%. The remaining constituents may suitably be asbestos fiber, wood fiber, ground cork, wood pulp, cotton linters, clay or the like, as fillers, together with suitable proportion of pigments to give the desired coloration.

Instead of first plasticizing the resin with the extract and subsequently mixing in the fillers, pigments, etc., the resin, extract and fillers, pigments or the like may be mixed together, effecting the plasticizing of the resin or binder and of the composition while mixing in the filler. In such case, a temperature which is at or somewhat below normal fusion temperatures of the resin or gum, say 250 to 300° F., may be used, the solvent action of the extract on the resin aiding in securing fusion and plasticizing the binder while intermingling the fillers, pigments, etc., therewith.

In carrying out the present invention, it is preferred to employ the non-paraffinic petroleum oil extract in a modified form, secured by blowing it with controlled quantities of air at high temperatures. In preparing a modified extract of this character, the extract employed is one derived from a residual oil, such as a bright oil or cylinder stock. By suitable control of the temperatures and quantities of air employed, the melting point of the material may be substantially increased and the characteristics of the extract may be modified to any desired extent. The temperature of blowing may vary from say, 300 to 500° F. and the time may vary from 3 or 4 to 15 hours, depending upon the characteristics desired in the final product. Thus, by increasing the temperature or the amount of air or the length of time, the melting point and the resistance to penetration or indentation of the product may be increased while the ductility, tenacity and binding or absorptive properties of the material are maintained to a very substantial extent. In general, it is found desirable to increase the melting point to 75° F. or above. For example, with an extract derived from a Mid-Continent residual oil and having initially a pour point of 65° F., by blowing for 5 hours with a moderate quantity of air and maintaining the temperature between 325 and 400°, using external firing when required, a product having a melting point of 82° F. is secured. Using a somewhat larger quantity of air and a temperature between 450 and 485° F., in the same length of time a product having a melting point of 155° F. was secured. By increasing the time of blowing in the latter case to 10 hours, a product of 245° F. was secured.

The blown extracts prepared in this manner are likewise effective in modifying resins and gums, a smaller proportion of the more expensive resin or gum being sufficient, however, to produce a binder having the desired properties when the blown extract product is employed. Thus, the relative proportion of the extract material in the binder may be increased in some cases to twice or even three times the proportion of unblown extract that is required. For example, a binder suitable, for example, for use in preparing flooring or tile may contain 80% of coumarone resin and 20% of unblown heavy extract. Used, for example, with asbestos fiber or other fibrous filler in the preparation of tile and flooring, it may be replaced by one containing only 60% of the same resin and 40% of blown extract having a melting point of 100° F. The proportion of the blown material may be from 10 to 90%. Such a binder may be used in proportions of from 25 to 40% with suitable fillers and pigments in making tile, flooring and the like. As in the case of the unblown extract, supra, the plasticizing of the binder and intermingling of the resin or gum and the blown extract may be effected at the same time at a temperature at or somewhat below the normal fusion temperature of the resin or gum.

The modified plasticized resinous product made by employing the blown extract have very material advantages in the preparation of thermoplastic compounds of the type hereinbefore referred to. Like the modified resin binders made with the unblown extract, they may be employed in the production of light colored products, for the blown extracts although apparently dark in color, do not have great hiding power and hence light pigments may be successfully employed with them.

The thermoplastic compositions made both with the blown and unblown products as modifiers or plasticizers for the resins employed have excellent binding qualities and impart strength and tenacity to the products. Because of the excellent wetting properties imparted by the extract material, relatively larger proportions of the fillers and pigments may be incorporated without loss of strength or molding properties than when resinous products as hitherto produced are employed as the binders. The compositions prepared in accordance with the present invention likewise have better cohesion and when used as surfacing compounds, have an increased adhesion to the material to which applied, also by reason of the marked wetting properties imparted by the extract material used in accordance with the present invention in modifying the resinous binder. A desirable property imparted to the thermoplastic compositions, such as tile, flooring and the like, and molded products that are prepared with binders made in accordance with the present invention is that termed "runability," the forming or sheeting and molding of the material being accomplished with greater ease and uniformity than is ordinarily secured.

Thermoplastic compositions prepared in accordance with the present invention may be used for other purposes than as molding compositions; for example, as wire coatings, saturating pitches, roofing pitches and the like. Larger proportions of the extract material and particularly of the unblown extract may be employed in the preparation of products such as roofing pitches, since permanent hardening is not required. In the case of wire coatings, when the material, compounded with suitable fillers, is applied to wire which has been coated with insulating materials and with fabric saturated with oil or other material and is then coated with a resinous compound containing a filler such as dolomite or clay, the use of non-paraffinic extracts in plasticizing or modifying the resin binder of the resinous coating gives greatly improved qualities as the resulting composition does not tend to stick or crack, and does not bleed through the outside lacquer coating which it later applied. A composition suitable for this purpose may contain a non-fibrous filler, such as clay, and 70 to 80% of binder, the latter being composed of 25 to 35 parts of resinous material and 65 to 75 parts of the air blown extract of 180° M. P., and is unusual in that it is substantially flame proof.

Thermoplastic compositions prepared with binders made in accordance with the present invention do not have any tendency to surface oiliness or waxiness and hence do not develop undesirable surface conditions. They are capable of receiving and maintaining a high, smooth surface finish and have excellent wearing properties and high resiliency.

This application is a continuation-in-part of our prior application Serial No. 146,976, filed June 7, 1937.

We claim:

1. A resinous binder comprising an organic resin and a plasticizer for said resin incorporated therewith, said plasticizer being a non-paraffinic extract from heavy petroleum oils, said extract consisting largely of naphthenic and aromatic hydrocarbons, and being substantially identical with that obtained from heavy petroleum oils by means of a solvent of the class consisting of furfural, dichlorethylether, phenol, cresol and nitrobenzol.

2. A resinous binder comprising an organic resin and a plasticizer for said resin incorporated therewith, said plasticizer being of the class consisting of non-paraffinic extracts from residual petroleum oil fractions and air-blown non-paraffinic extracts from residual petroleum oils, said extracts consisting largely of naphthenic and aromatic hydrocarbons and being substantially identical with the extracts obtained from said residual petroleum oils by means of a solvent of the class consisting of furfural, dichlorethylether, phenol, cresol and nitrobenzol.

3. The method of forming a plasticized resinous binder for use in thermoplastic molding compositions which comprises mixing an organic resinous material with a non-paraffinic extract from heavy petroleum oils, said extract consisting largely of naphthenic and aromatic hydrocarbons, and being substantially identical with the extract obtained from heavy petroleum oils by means of a solvent of the class consisting of furfural, dichlorethylether, phenol, cresol and nitrobenzol, said mixing being performed while maintaining a temperature sufficient to effect incorporation of the extract in the resinous material.

4. The method of forming a plasticized resinous binder for use in thermoplastic molding compositions which comprises thoroughly mixing an organic resinous material with an air-blown non-paraffinic extract from a residual petroleum oil, said extract consisting largely of naphthenic and aromatic hydrocarbons and having a melting point of at least 75° F., and being substantially identical with the extract obtained from a residual petroleum oil by means of a solvent of the class consisting of furfural, dichlorethylether, phenol, cresol and nitrobenzol, said mixing being performed while maintaining a temperature such as to keep the mixture in molten state.

5. A thermoplastic molding composition comprising fillers and a resinous binder comprising an organic resin and a plasticizer therefor incorporated therewith, said plasticizer being a non-paraffinic extract from heavy petroleum oils, said extract consisting largely of naphthenic and aromatic hydrocarbons and being substantially identical with the extract obtained from heavy petroleum oils by means of a solvent of the class consisting of furfural, dichlorethylether, phenol, cresol and nitrobenzol.

6. A thermoplastic molding composition comprising fillers and a resinous binder comprising an organic resin and a plasticizer therefor incorporated therewith, said plasticizer being an air-blown non-paraffinic extract from heavy petroleum oils, said extract consisting largely of naphthenic and aromatic hydrocarbons and being substantially identical with the extract obtained from heavy petroleum oils by means of a solvent of the class consisting of furfural, dichlorethylether, phenol, cresol and nitrobenzol.

7. A thermoplastic molding composition comprising a fibrous filler and 25 to 40% of a plasticized resinous binder containing an organic resin and a plasticizer therefor, said plasticizer being a non-paraffinic extract from residual petroleum oils, having a melting point of about 100° F., said extract consisting largely of naphthenic and aromatic hydrocarbons, and being substantially identical with the extract obtained from residual petroleum oils by means of a solvent of the class consisting of furfural, dichlorethylether, phenol, cresol and nitrobenzol, said resin and said plasticizer being in the proportions of 60 to 70 parts of the former to 40 to 30 parts of the latter.

8. A thermoplastic molding composition comprising a non-fibrous filler and 70 to 80% of a plasticized resinous binder containing an organic resin and a plasticizer therefor, said plasticizer being an air-blown non-paraffinic extract from residual petroleum oils, having a melting point of about 180° F., said extract consisting largely of naphthenic and aromatic hydrocarbons, and being substantially identical with the extract obtained from residual petroleum oils by means of a solvent of the class consisting of furfural, dichlorethylether, phenol, cresol and nitrobenzol, said resin and said plasticizer being in the proportions of 25 to 35 parts of the former to 65 to 75 parts of the latter.

HARRY W. LAWSON.
JOHN L. GILLERLAIN.